United States Patent [19]

Huber

[11] Patent Number: 5,004,087

[45] Date of Patent: Apr. 2, 1991

[54] FRICTION CLUTCH

[75] Inventor: Lothar Huber, Altschweier, Fed. Rep. of Germany

[73] Assignee: Luk Lamellen Und Kupplungsbau GmbH, Bühl, Fed. Rep. of Germany

[21] Appl. No.: 384,129

[22] Filed: Jul. 21, 1989

[30] Foreign Application Priority Data

Jul. 25, 1988 [DE] Fed. Rep. of Germany ....... 3825197

[51] Int. Cl.$^5$ .............................................. F16D 13/50
[52] U.S. Cl. ................................... 192/89 B; 192/70.27
[58] Field of Search ............................. 192/89 B, 70.27

[56] References Cited

U.S. PATENT DOCUMENTS

| 3,361,239 | 1/1968 | Binder | 192/89 B X |
|---|---|---|---|
| 3,811,544 | 5/1974 | Nancher | 192/89 B |
| 3,939,951 | 2/1976 | Sink et al. | 192/89 B |
| 4,195,719 | 4/1980 | Martinez | 192/89 B |
| 4,273,228 | 6/1981 | Huber | 192/89 B |
| 4,641,736 | 2/1987 | Förster | 192/89 B |
| 4,660,700 | 4/1987 | Mancher et al. | 192/89 B |
| 4,781,280 | 11/1988 | Huber | 192/70.27 |

FOREIGN PATENT DOCUMENTS 2152158 7/1985 United Kingdom ............. 192/89 B

Primary Examiner—Richard Lorence
Attorney, Agent, or Firm—Peter K. Kontler

[57] ABSTRACT

A friction clutch wherein the clutch spring is held between two seats at one side of the clutch cover has an annular set of beams one end of each of which is integral with a discrete torsion bar of the cover and the other end of each of which carries one head of a rivet having a second head overlying that seat which is remote from the cover. The beams and/or the torsion bars are deformed during assembly of the clutch so that the rivets urge the remote seat toward the spring and the latter is urged against the other seat.

9 Claims, 2 Drawing Sheets

FRICTION CLUTCH

BACKGROUND OF THE INVENTION

The invention relates to friction clutches, for example, to friction clutches for use in motor vehicles. More particularly, the invention relates to improvements in friction clutches of the type wherein the means for connecting the clutch spring and its seat or seats to the clutch cover constitute or include integral parts of the cover.

Friction clutches of the above outlined character are known and enjoy widespread use in the automotive and other industries. Reference may be had, for example, to commonly owned U.S. Pat. No. 4,660,700 to Maucher et al. However, it has been found that presently known friction clutches wherein the spring is held at the inner side of the cover by integral parts of the cover (either alone or in combination with rivets or analogous fasteners) are not entirely satisfactory if the diameter of the clutch spring (such as a diaphragm spring) is rather large while the maximum diameter of the clutch is relatively small. The length of integral portions of the cover (these portions can be said to constitute lugs or beams) is then limited by the space which is available between the seat or seats for the clutch spring and the radially outermost portion of the cover. Therefore, the ratio of bias (force) to displacement of these relatively short beams is rather unsatisfactory. The characteristic curves of such beams are steep which results in pronounced hysteresis between the clutch engaging and disengaging forces of the clutch spring. This is also attributable to the fact that, in such types of friction clutches, that seat for the clutch spring which is remote from the inner side of the cover must be afforded a certain freedom of movement in a direction toward the cover in order to compensate for wear upon the parts in the region where the clutch spring is tilted during engagement or disengagement of the clutch.

OBJECTS OF THE INVENTION

An object of the invention is to provide a friction clutch wherein the wear upon the parts in the region of tilting of the clutch spring with reference to the cover can be compensated for in a novel and improved way.

Another object of the invention is to provide a friction clutch which is more efficient than heretofore known friction clutches and wherein the bias (force) to displacement ratio of the beams is more satisfactory than in conventional clutches.

A further object of the invention is to provide novel and improved methods of assembling the above outlined friction clutch.

An additional object of the invention is to provide a novel and improved cover for use in the above outlined friction clutch.

Still another object of the invention is to provide a friction clutch wherein the cover is not unduly weakened as a result of the utilization of certain portions of the cover as a means for connecting the cover with the clutch spring and with one or more seats for the clutch spring.

A further object of the invention is to provide a friction clutch wherein the clutch spring is held against wobbling in a novel and improved way.

An additional object of the invention is to provide a friction clutch wherein the clutch spring is biased toward the adjacent side of the clutch cover in a novel and improved way.

SUMMARY OF THE INVENTION

One feature of the present invention resides in the provision of a friction clutch which can be used with particular advantage in the power trains of motor vehicles and comprises a normally cup-shaped or dished cover having a first side and a second side, an axially movable pressure plate adjacent the first side and non-rotatably but axially movably coupled to the cover, a clutch spring (preferably a diaphragm spring) disposed between the cover and the pressure plate and including means (such as a circumferentially complete annular portion) for biasing the pressure plate (particularly axially and away from the cover in engaged condition of the clutch), a first seat between the cover and the clutch spring (this seat can constitute a discrete part, e.g., a wire ring, or it may be an integral part of the cover or an integral part of the clutch spring), a second seat (e.g., a wire ring) between the clutch spring and the pressure plate, and novel and improved means for connecting the first and/or second seat and the clutch spring to the cover. The connecting means includes a plurality of beams (e.g., in the form of lugs) and torsion bars which are integral with the cover and with the beams. Each beam includes a free end and a second end which is integral with one of the torsion bars. As a rule, the beams and/or the torsion bars are elastically stressed. The beams are stressed in the axial direction of the pressure plate, i.e., in the axial direction of the friction clutch.

Each torsion bar preferably includes a median or central portion which is integral with the second end of the respective beam, and two outer portions which flank the median portion of the torsion bar.

Each beam can be disposed substantially radially of the pressure plate in such orientation that its free end is disposed radially outwardly of the second end, i.e., the torsion bars are radially inwardly adjacent the respective beams.

The cover can include an annular corrugation, and the torsion bars can constitute integral parts of such corrugation.

The cover can be provided with windows each of which has a substantially triangular outline and each of which surrounds one of the beams and is adjacent the corresponding torsion bar. The arrangement is or can be such that each window has one side which is substantially parallel to the respective torsion bar and is interrupted in the region of the second end of the corresponding beam, i.e., at the locus where the beam is integral with the median portion of the associated torsion bar.

The beams together form an annulus, and the cover can include substantially triangular portions which alternate with the beams of the aforementioned annulus. Each substantially triangular portion includes a base and an apex, with the apex preferably disposed inwardly of the base (as seen in the radial direction of the friction clutch and its pressure plate), and each of the apices is disposed between two neighboring torsion bars.

The connecting means can further comprise fasteners (e.g., in the form of rivets) each of which has a first portion (such as one of the two heads of a rivet) which is rigid with one of the beams at the free end of the respective beam, and a second portion (such as the other head of a rivet) which overlaps the second seat between the second seat and the pressure plate. Each fastener includes a shank having a length which is or can be less than the combined thickness of the clutch spring and the two seats (as seen in the axial direction of the friction clutch and its pressure plate).

Another feature of the invention resides in the provision of a method of assembling a friction clutch wherein a clutch spring (particularly a diaphragm spring) is located between two seats at one side of a clutch cover and the clutch cover has a plurality of beams one end of each of which is integral with a discrete torsion bar of the cover. The improved method comprises the steps of bending the beams from the general plane of the clutch cover in a first direction away from the one side of the cover, positioning the clutch spring between the seats at the one side of the cover, and bending the beams in a second direction counter to the first direction. The step of bending the beams in the first direction can include bending the beams beyond the elastic limit of their material. Such step of bending the beams in the first direction can include or entails a twisting of the torsion bars in a predetermined direction beyond the elastic limit of the material of torsion bars. The step of bending the beams in the second direction can include twisting the torsion bars counter to the predetermined direction beyond the elastic limit of the material of torsion bars. The step of bending the beams in the second direction can include bending the beams beyond the elastic limit of their material.

A further feature of the invention resides in the provision of a method of assembling a friction clutch wherein a clutch spring (particularly a diaphragm spring) is located between two seats at one side of a cupped or dished clutch cover and the cover has a plurality of beams one end of each of which is integral with a discrete torsion bar of the cover and the free other end of each of which is remote from the respective torsion bar. The method comprises the steps of positioning the spring between the seats at the one side of the cover, placing the head at one end of each of a plurality of rivets or like fasteners into a position of overlap with that seat which is remote from the cover, bending the beams from the general plane and beyond the one side of the cover, and securing the other end of each rivet to the other end of a discrete bent beam so that the length of each rivet between the one and the other end is less than the combined thickness of the two seats and the clutch spring. The bending step can include twisting the torsion bars so that the twisted torsion bars tend to return the bent beams into the plane of the cover.

One of the seats is or can be integral with the spring or with the cover. For example, such one seat can constitute a circumferentially complete or interrupted annular corrugation of the cover.

The novel features which are considered as characteristic of the invention are set forth in particular in the appended claims. The improved friction clutch itself, however, both as to its construction and the mode of assembling the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
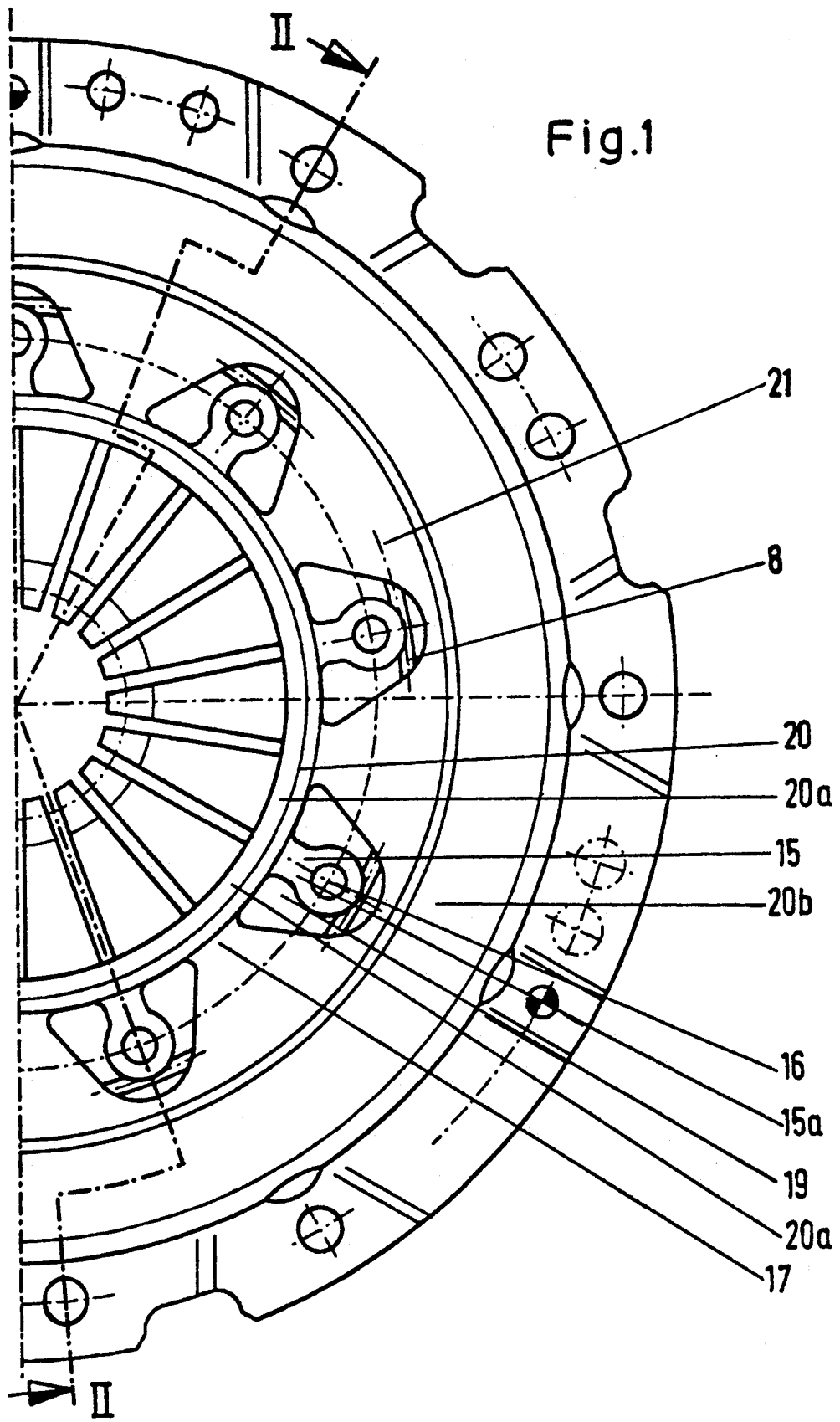
FIG. 1 is a fragmentary side elevational view of a friction clutch which embodies one form of the invention.
Figure 2:
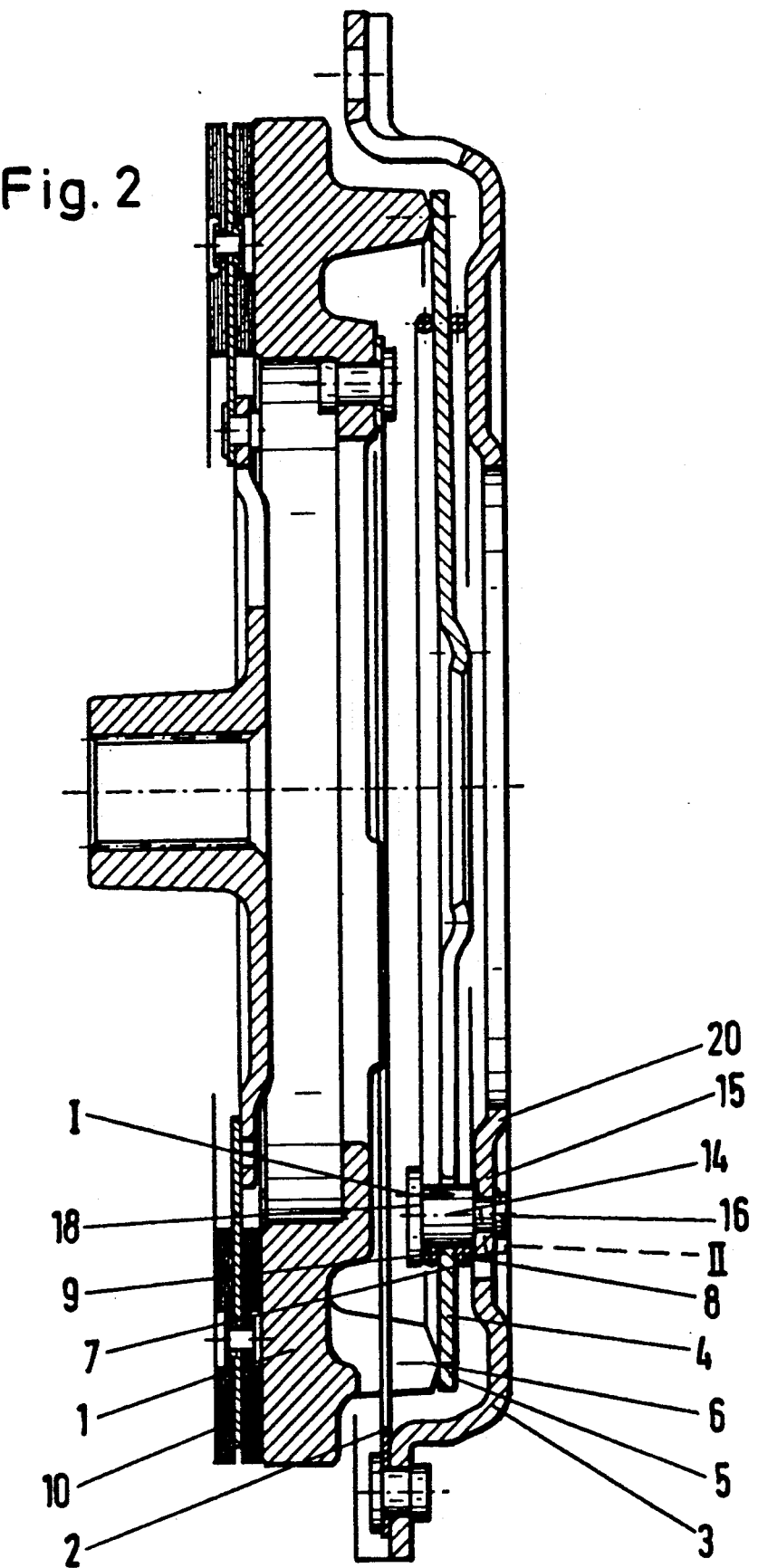
FIG. 2 is a sectional view substantially as seen in the direction of arrows from the line II—II of FIG. 1.

The friction clutch which is shown in FIGS. 1 and 2 can be used in the power train between the output shaft (e.g., a crankshaft) of the engine and the input shaft of a variable-speed transmission in a motor vehicle. The illustrated friction clutch comprises a substantially cup-shaped or dished cover 3 the inner side of which confronts an axially movable pressure plate 1. The latter can bias the friction linings of a clutch disc or clutch plate 10 against a flywheel (not shown) which is driven by the output shaft of the engine whereby the internally splined hub of the clutch plate 10 transmits torque to the input shaft of the variable-speed transmission. The means for biasing the pressure plate 1 axially and away from the cover 3 comprises a clutch spring 4 here shown as a diaphragm spring having an outer marginal portion 5 which serves as a means for biasing the pressure plate 1 to the left, as seen in FIG. 2. The clutch plate 1 has an annulus of projections 6 which are engaged by the marginal portion 5 of the clutch spring 4 when the friction clutch is engaged so that the friction linings of the clutch plate 10 receive torque from the engine (when the engine is on) and the hub of clutch plate transmits torque to the input shaft of the variable-speed transmission. Reference may be had to numerous U.S. and foreign patents and patent applications of the assignee of the present application.

The pressure plate 1 is axially movably but non-rotatably connected to the cover 3 by a set of substantially tangentially disposed leaf springs 2 (two shown in FIG. 2).

The spring 4 further includes a set of radially inwardly extending prongs (not referenced) which can be engaged by a bearing forming part of a non-illustrated clutch disengaging device which is movable in a direction to the left, as seen in FIG. 2, in order to tilt a median portion 7 of the diaphragm spring 4 between two ring-shaped seats and to thus move the marginal portion 5 to the right so that the pressure plate 1 can be disengaged from the clutch plate 10 which then ceases to transmit torque to the input shaft of the transmission.

The illustrated friction clutch includes a first seat 8 which is a wire ring disposed between the inner side of the cover 3 and the respective side of the median portion 7 of the diaphragm spring 4, and a second seat 9 in the form of a second wire ring adjacent that side of the median portion 7 which faces away from the cover 3. The seat 8 can be replaced with a seat which is integral with the cover 3 or with the diaphragm spring 4. For example, the illustrated seat 8 in the form of a wire ring can be replaced with a circumferentially complete or interrupted corrugation of the cover 3 adjacent the respective side of the median portion 7 of the diaphragm spring 4.

In accordance with a feature of the invention, the friction clutch further comprises novel and improved means for connecting the package including the spring 4 and the seats 8, 9 to the inner side of the cover 3 in such a way that the median portion 7 of the spring 4 is held without play or without any appreciable play between the seats 8 and 9 even if the median portion 7 and/or the seat 8 and/or 9 undergoes extensive wear as a result of repeated tilting of the spring 4 relative to the cover 3 and pressure plate 1. The illustrated connecting means comprises an annulus of deformable lugs or beams 15 each of which has a free end and a second end integral with a discrete torsion bar 20a of the cover 3. The connecting means further comprises a discrete rivet-like fastener 16 for each of the beams 15. The fasteners 16 have shanks 14 which extend through suitably configured holes of the spring 4 and the overall length of which is or can be less than the combined thickness of the median portion 7 of the clutch spring 4 and the seats 8, 9. The fasteners 16 can be omitted if the beams 15 are replaced with beams of the type disclosed, for example, in FIGS. 10-11 of commonly owned U.S. Pat. No. 4,781,280 to Huber. In other words, each beam 15 can comprise an extension which passes through a slot of the spring 4 and is bent or otherwise deformed at its free end so that it overlies the seat 9, namely the seat which is remote from the cover 3.

In the illustrated embodiment, each rivet 16 has a head 18 which overlies the adjacent portion of the seat 9. A smaller-diameter portion of the shank 14 of each rivet 16 passes through a hole of the respective beam 15 and its free end is deformed to constitute a second head overlying that side of the free end of the respective beam 15 which faces away from the spring 4 and seats 8, 9.

The beams 15 are formed as a result of removal of material from the cover 3 so that the latter is provided with substantially triangular windows or cutouts 19 each of which surrounds an entire beam 15 save for that end of the beam which is integral with a discrete substantially tangentially disposed elongated torsion bar 20a of the cover 3. The windows 19 have elongated sides which are adjacent and parallel the respective torsion bars 20a, and each such torsion bar forms an integral part of a circumferentially complete annular reinforcing corrugation or bead 20 of the cover 3 radially inwardly of the windows 19 and beams 15. The circumferentially complete bead 20 greatly enhances the rigidity of the cover 3. Each torsion bar 20a includes a median or central portion which is integral with the adjacent radially inner end of the respective beam 15, and two outer portions or end portions which flank the median portion and are inwardly adjacent the respective radially innermost portions of the respective windows 19.

FIG. 1 shows that the beams 15 of the annulus of such beams alternate with substantially triangular portions 17 of the cover 3. Each triangular portion 17 has a base which is remote from the bead 20 and is integral with a circumferentially complete annular portion 20b of the cover 3, and an apex which is adjacent two neighboring torsion bars 20a and is also adjacent the radially innermost portions of two neighboring substantially triangular windows 19. As shown, the apex of each triangular portion 17 of the cover 3 is outwardly adjacent one of those portions of the bead 20 which are disposed between and alternate with the torsion bars 20a. However, it is difficult to establish a clear-cut line of demarcation or boundary between the two outer portions of a torsion bar 20a and the adjacent portions of the bead 20 because, when the beams 15 are bent with reference to the major portion of the cover, not only the torsion bars 20a but also the bead portions between such torsion bars are likely to undergo at least some twisting to store energy and to tend to return the beams 15 into the general plane of the cover 3, i.e., into the respective windows 19. When properly stressed, the torsion bars 20a apply to the respective beams 15 forces which cause the beams to urge the seat 9 against the median portion 7 of the spring 4, to urge the median portion 7 of the spring 4 against the seat 8 and to urge the seat 8 against the abutments 21 at the inner side of the cover 3. The magnitude and the characteristic curves of torsional stresses which are applied by the torsion bar 20a substantially in the axial direction of the pressure plate 1 depend upon the cross-sectional areas of the torsion bars, upon the length of the torsion bars and upon the extent of twisting of the torsion bars in assembled condition of the friction clutch. Twisting of torsion bars 20a is achieved in that the beams 15 are bent with reference to the major portion of the cover 3 in the direction of arrow I which is shown in FIG. 2, i.e., in a direction away from the pressure plate 1. Such bending of the beams 15 in the direction of arrow I takes place prior to mounting of the spring 4 at the inner side of the cover 3. One of the thus bent beams 15 is indicated in FIG. 2 by broken lines, as at II. Instead of bending the beams 15 in the direction of arrow I (or in addition to such bending of the beams), it is also possible to directly twist the torsion bars 20a until the respective beams 15 assume positions corresponding to that of the beam which is shown at II by broken lines.

In order to assemble the illustrated friction clutch, the beams 15 are bent to or are maintained in positions corresponding to the solid-line position of the beam which is shown in the lower part of FIG. 2. In the next step, the seat 8 is placed against the abutments 21 of the cover 3, one side of the median portion 7 of the spring 4 is placed against the seat 8, and the seat 9 is placed against the side of the median portion 7. The heads 18 of the rivets 16 are then placed against that side of the seat 9 which faces away from the spring 4, and the other end portion of each rivets 16 is then riveted to the free end of the respective beam 15. If desired or necessary, that end of each beam 15 which is integral with the respective torsion bar 20a can be made thinner than the remaining portion of the beam so that the beams exhibit a more pronounced elasticity in regions adjacent the corresponding torsion bars. All that counts is to ensure that the head 18 of each rivet 16 cooperates with the respective beam 15 so as to urge the seat 9 in a direction toward the inner side of the cover 3, even after extensive wear upon the seats 8, 9 as a result of rubbing contact with the tiltable median portion 7 of the spring 4 and even after extensive wear upon the median portion 7 of the spring as a result of tilting relative to the seats 8, 9. In other words, the characteristic curves and the magnitude of the clamping forces to which the seats 8, 9 and the spring 4 are subjected (to urge the seat 9 against the median portion 7, to urge the median portion 7 against the seat 8 and to urge the seat 8 against the abutments 21) must be selected with a view to compensate for wear and to prevent the establishment of play between the median portion 7 and the seats 8, 9, between the seat 9 and the heads 18 of the rivets 16, and between the seat 8 and the abutments 21 after long periods of use of the friction clutch and after repeated engagement and disengagement of the clutch (this involves tilting of median portion 7 of the spring 4 with reference to the seats 8 and 9). The bias of the beams 15 and/or torsion bars 20a suffices to ensure that no such play develops during the entire period of use of the friction clutch because the heads 18 of the rivets 16 simply move closer to the inner side of the cover 3 as the wear upon the parts 18, 9, 7, 8 and 21 progresses. Moreover, the bias of the torsion bars 20a (with or without the bias of the beams 15) should suffice to ensure that no play develops in the region of the median portion 7 of the spring 4 while the latter is in the process of being tilted relative to the seats 8 and 9, either in a direction to bias the pressure plate 1 toward the friction linings of the clutch plate 10 or in a direction to permit the pressure plate 1 to move toward the cover 3. The median portion 7 of the spring 4 tends to move away from the seat 8 while the inner end portions of the prongs of this spring are moved to the left (as seen in FIG. 2) in order to disengage the clutch.

It is further desirable to select the bias of the beams 15 and torsion bars 20a in such a way that the median portion 7 of the spring 4 is not clamped with an excessive force in a freshly assembled (new) friction clutch. This reduces hysteresis and enhances the efficiency of the friction clutch.

The improved friction clutch can be modified in a number of ways without departing from the spirit of the invention. For example, it is not necessary that the longitudinal axis (15a) of each beam 15 extend substantially radially of the pressure plate 1 and/or that the torsion bars 20a be disposed radially inwardly of the respective beams 15. Thus, the bead 20 can be located radially outwardly of the annulus of beams 15 and the apices of triangular portions 17 are then inwardly adjacent the bead 20. Still further, the bead 20 can remain in the illustrated position but the beams 15 can be disposed radially inwardly of such bead. The torsion bars 20a can be provided in the maximum-diameter region of the cover 3.

The axes 15a of the beams 15 can extend tangentially of the seats 8 and 9, and the torsion bars 20a then extend radially of the cover 3 and pressure plate 1. It is also possible to form the beams 15 (i.e., to select the orientation of the axes 15a) in such a way that each axis 15a makes an acute angle (e.g., an angle of 45°) with an axis which extends radially or nearly radially of the friction clutch. The illustrated orientation and positioning of the beams 15 and torsion bars 20a (with the axes 15a of the beams extending radially and with the torsion bars extending tangentially of the seats 8, 9 adjacent the radially innermost portions of the respective beams 15) is preferred at this time because this does not result in any, or any appreciable, reduction of stability of the cover 3.

In accordance with one presently preferred method of assembling the improved friction clutch, the beads 15 are first bent with reference to the common plane of triangular portions 17 of the cover 3. This can be achieved in the course of the stamping operation (when the cover 3 is formed with the windows 19) or in a subsequent step. The beams 15 then extend in a direction away from the inner side of the cover 3, i.e., in a direction away from the spring 4 in the fully assembled friction clutch. As mentioned above, such bending of the beams 15 can be achieved by flexing the beads themselves. However, it is equally within the purview of the invention to bend the beams 15 simultaneously with twisting of the corresponding torsion bars 20a or to twist the torsion bars 20a in directions to move the respective beams to the aforementioned positions with the free ends of the beams disposed at the outer side of the cover. The beams 15 can be bent beyond the elastic limit of the material of the cover 3, and the torsion bars 20a can be twisted beyond the elastic limit of such material. It is presently preferred to carry out the bending step in such a way that the beams 15 are permanently deformed and that the torsion bars 20a also undergo permanent deformation in order to maintain the beams in positions corresponding to that which is shown in FIG. 2 by broken lines.

The next step involves at least partial bending of the beams 15 in the opposite direction with attendant elastic deformation of the torsion bars 20a. In other words, the beams 15 are bent back toward the common plane of the triangular portions 17 of the cover 3 to such an extent that the respective torsion bars 20a store energy and tend to move the corresponding beams away from the common plane of the triangular portions 17 in a direction away from the inner side of the cover 3. This ensures that, when the clutch is assembled, the torsion bars 20a tend to move the median portion 7 of the spring 4 in a direction toward the abutments 21 of the cover 3, i.e., in a direction counter to that in which the median portion 7 is urged during disengagement of the clutch. At such time, the aforementioned clutch disengaging bearing acts upon the radially innermost portions of the prongs of the spring 4 and urges such end portions in a direction to the left, as seen in FIG. 2.

In order to simplify the assembly of the clutch and to ensure that the assembling step will compensate for manufacturing tolerances, it is often desirable to bend the beams 15 back toward the common plane of triangular portions 17 and/or to deform (twist) the torsion bars 20a beyond the elastic limit of the material of the cover. However, care should be exercised to ensure that, when the assembly of the clutch is completed, the force with which the parts 18, 9, 7 and 8 are urged toward the abutments 21 suffices to guarantee that the median portion 7 of the spring 4 will not wobble between the seats even after long periods of use of the clutch and after extensive wear upon the parts in the region of tilting of the spring 4. At least the torsion bars 20a should store a certain minimum amount of energy when the assembly of the clutch is completed.

The just described assembling method can be practiced irrespective of whether the means for connecting the seats 8, 9 and the spring 4 to the cover 3 includes beams 15 and rivets 16 or only beams, e.g., beams of the type shown in FIG. 11 of the aforementioned commonly owned U.S. Pat. No. 4,781,280 to Huber. If the connecting means further comprises rivets 16 or analogous fasteners, the assembling of the improved friction clutch can be carried out as follows: The dimensions of shanks 14 of the rivets 16 are selected in such a way that the length of each shank is less than the combined thickness of the seats 8, 9 and the median portion 7 of the spring 4. In order to render it possible to employ rivets 16 having such relatively short shanks 14, the thickness of those portions of the seat 8 (which can be a discrete ring or an integral bead or corrugation at the inner side of the cover 3) which are adjacent the shanks 14 is less than the thickness of remaining portions of the seat 8 (between neighboring beams 15). In fact, the seat 8 can be completely interrupted in the region of each beam 15. An interrupted seat 8 renders it possible to bend the beams 15 in a direction toward the inner side of the cover 3. Such bending of the beams 15 entails or can entail a twisting of the corresponding torsion bars 20a. The just described method of assembling the friction clutch can but need not dispense with the aforementioned step of bending the beams 15 in a direction toward positions corresponding to that which is shown in FIG. 2 at II by broken lines.

The inner seat 8 can be formed by providing the cover 3 with an annulus of arcuate corrugations which extend beyond its inner side and are separated from each other in the regions of the beams 15. The beams 15 themselves need not be provided with any corrugations or can be provided with corrugations which are less pronounced (shallower) than those which form an integral seat at the inner side of the cover 3.

An important advantage of the improved friction clutch is that the bias-displacement ratio of the beams 15 is independent of the length of the beams (in directions from their free ends toward the locations where the beams are integral with the respective torsion bars 20a). Another advantage of the improved friction clutch is its simplicity. The efficiency of the clutch is greater than that of heretofore known friction clutches.

The utilization of torsion bars between the beams and the cover, together with the utilization of torsion bars which are integral parts of the cover, renders it possible to optimally conform the parameters, especially the steepness, of the characteristic curves of resilient elements each of which includes a torsion bar and the corresponding beam to an optimum value. Since the illustrated torsion bars 20a extend in the circumferential direction and substantially tangentially of the seats 8 and 9, it is possible to select relatively flat characteristic curves which is desirable and advantageous because a reduction of the bias upon the parts 9, 7, 8 in a direction toward the abutments 21 of the cover 3 as a result of progressing wear upon the spring 4 and the seats is relatively small so that the median portion 7 of the spring 4 can be tilted without play even after the parts 8, 7 and 9 have undergone extensive wear. Otherwise stated, the initial clamping force need not be very pronounced without risking the development of play between the median portion of the spring and the adjacent parts after long periods of use of the friction clutch and extensive wear upon the parts 18, 9, 7, 8 and 21. This ensures that the hysteresis between the engaging and disengaging forces is small.

Since the outer portions of the torsion bars 20a do or can extend well beyond the adjacent inner ends of the respective beams 15, the elasticity of each torsion bar can be readily selected in such as way that its superimposition upon the elasticity of the respective beam is readily discernible. This improves the aforementioned bias (force) to displacement ratio of the beams.

It has been found that the making of triangular windows 19 contributes to simplicity and lower cost of the making of cover 3 and its beams 15 and torsion bars 20a. The same applies for the placing of integral connections between the beams 15 and the respective torsion bars 20a substantially or exactly midway between the ends of those sides of the respective windows 19 which are outwardly adjacent the bead 20. It has also been found that the stability of the cover 3 can remain high and that the elasticity of each resilient element including a torsion bar 20a and the respective beam 15 can be caused to assume an optimum value by appropriate selection of the dimensions of substantially triangular windows 19 and substantially triangular portions 17 of the cover.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a cover having a first side and a second side; an axially movable pressure plate adjacent the first side of said cover; at least one diaphragm spring including means for biasing said pressure plate; a first seat between said cover and said spring; a second seat, said spring being disposed between said seats; and means for connecting said second seat and said spring to said cover, including a plurality of beams and elongated torsion bars integral with said cover and with said beams, each of said beams including a free end and a second end which is integral with one of said torsion bars and each of said torsion bars including a median portion integral with the second end of the respective beam and two outer portions flanking the median portion, said beams being elastically stressed in the axial direction of said pressure plate and the magnitude of stress upon each beam being dependent upon the cross-sectional area and the length of the respective torsion bar.

2. The clutch of claim 1, wherein each of said beams is disposed substantially radially of said pressure plate, said second end of each of said beams being disposed radially inwardly of the respective free end.

3. The clutch of claim 1, wherein said cover includes an annular corrugation and said torsion bars are integral parts of said corrugation.

4. The clutch of claim 1, wherein said cover has windows each of which has a substantially triangular outline, each of said windows surrounding one of said beams and being adjacent one of said torsion bars.

5. The clutch of claim 4, wherein each of said windows has a side which is substantially parallel to the respective torsion bar and is interrupted in the region of the second end of the respective beam.

6. The clutch of claim 1, wherein said beams together form an annulus and said cover has substantially triangular portions which alternate with the beams of said annulus.

7. The clutch of claim 6, wherein each of said substantially triangular portions includes a base and an apex disposed inwardly of the base in the radial direction of said pressure plate, each of said apices being disposed between two of said torsion bars.

8. The clutch of claim 1, wherein said connecting means further comprises fasteners each having a first portion rigid with one of said beams and a second portion overlapping said second seat.

9. The clutch of claim 8, wherein each of said fasteners includes a shank having a length which is less than the combined thickness of said seats and said spring in the axial direction of said pressure plate.

* * * * *